Dec. 1, 1931.  O. E. ANDRUS  1,834,483
APPARATUS FOR ELECTRIC RESISTANCE HEATING
Filed Sept. 10, 1930
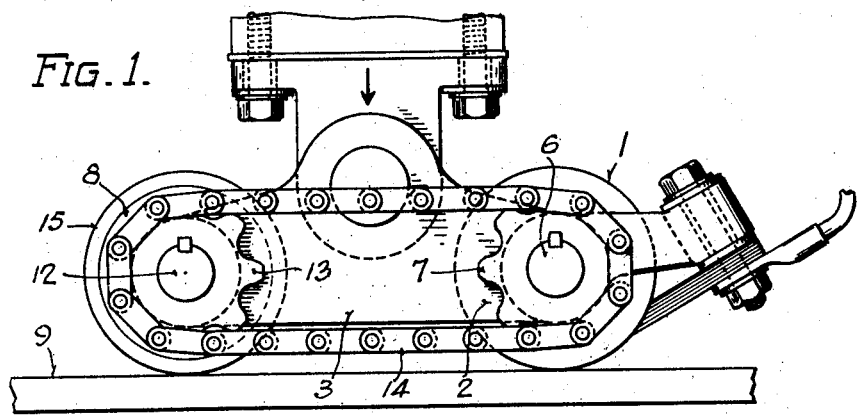
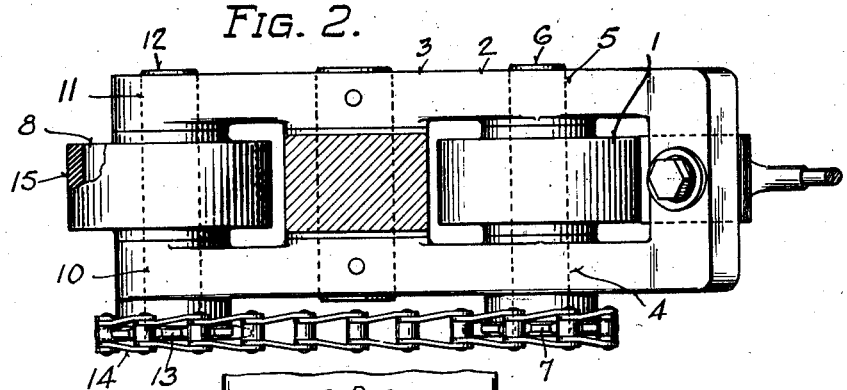
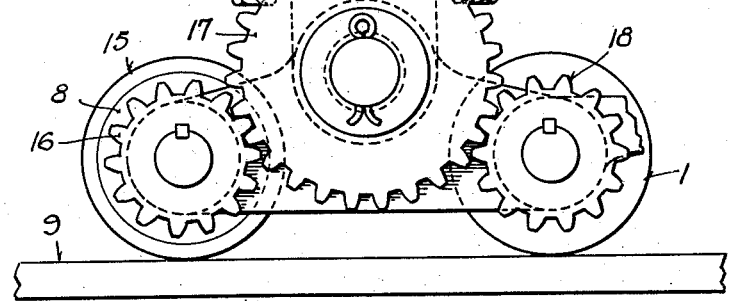
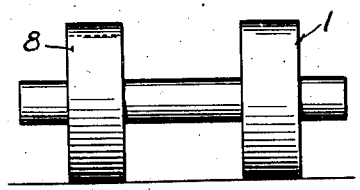
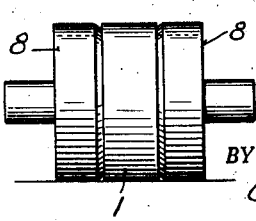
INVENTOR.
Orrin E. Andrus
BY
ATTORNEY.

Patented Dec. 1, 1931

1,834,483

UNITED STATES PATENT OFFICE

ORRIN E. ANDRUS, OF WAUWATOSA, WISCONSIN, ASSIGNOR TO A. O. SMITH CORPORATION, OF MILWAUKEE, WISCONSIN, A CORPORATION OF NEW YORK

APPARATUS FOR ELECTRIC RESISTANCE HEATING

Application filed September 10, 1930. Serial No. 480,871.

The present invention relates to an apparatus for electric resistance heating wherein current is transmitted to the work to be heated by means of roller electrodes.

An object of the invention is to provide an apparatus for moving a roller resistance heating electrode relative to the work to be heated which eliminates slippage of said electrode.

Various other objects will be apparent from the following description and claims.

The invention will be best understood by referring to the accompanying drawings in which:

Figure 1 is an elevation of the roller electrode assembly.

Fig. 2 is a top view of the assembly.

Fig. 3 is a side view of a modified embodiment of the invention.

Fig. 4 is an end view of another modification.

Fig. 5 is a similar view of another modified embodiment of the invention.

In the process of progressively heating metal parts for heat treating or welding by electric resistance, the passage of heavy current into the work to be heated is preferably accomplished by means of roller electrodes. In progressive resistance heating the passage of current into the work is accompanied by sufficient pressure to secure good electrical contact preferably exerted through the electrodes themselves. The result is that the roller often lacks sufficient traction to overcome the friction of the bearing in which it rotates, or in case the roller electrode propels the heating apparatus along the work, it lacks traction to move the apparatus along said work. Slippage of the electrode in either event usually results in burning the parts to be heat treated and injuring the electrode.

The electrode 1 is journalled in the bracket 2 of the frame 3 of the welding apparatus. Suitable bearings 4 and 5 support the axle 6. A sprocket 7, as shown in Figs. 1 and 2, is keyed to the axle 6.

A traction wheel 8, adapted to contact with the work 9 to be welded, is journalled to the frame 3 by means of suitable bearings 10 and 11 adapted to support the axle 12. A sprocket 13 is keyed to the axle 12 and is placed in direct alignment with the sprocket 7 on the axle 6.

The traction wheel 8 is preferably of the same diameter as the roller electrode 1, though the peripheral velocities of said wheel and electrode may be coordinated by the size of the sprockets or by suitable gearing if the wheel and electrode are of unequal size.

A chain 14 is placed over the sprockets 7 and 13 so that rotation of the traction wheel 8 will effect a coordinated rotation of the roller electrode 1.

The frame 3, bearing the electrode 1 and the traction wheel 8, may be propelled along the work 9 to be heated by suitable means, or the work may be propelled beneath the electrode to effect the relative movement.

The traction wheel 8 may be provided with a rubber tire 15 to increase its traction and to insulate it from the work.

As the wheel 8 is rotated by its progress relative to the work 9, the roller electrode 1 is rotated at the same peripheral velocity as said wheel and moves relative to the work at the same speed. Thus there is no chance for slippage with its accompanying harmful effects.

The modification shown in Fig. 3 employs a train of gears 16, 17, and 18 to effect coordinated movement between the roller 1 and the wheel 8.

In the embodiment shown in Fig. 4 the traction wheel 8 is mounted upon the same shaft as the roller electrode 1 to secure positive coordination of rotation.

In Fig. 5 the traction wheels 8 are shown to be in abutting relation to the roller electrode 1.

Various other embodiments may be employed within the scope of the appended claims.

I claim:

1. In an electric resistance heating apparatus, a roller electrode, means for advancing said roller relative the work to be heated, and means for coordinating the rotation of the roller with the rate of advance, thereby eliminating slippage.

2. In an electric resistance heating apparatus, a roller electrode, a frame mounting for said electrode, means for moving said frame relative to the work thereby advancing said roller along the work to be heated, and means for coordinating the rotation of said electrode with the rate of advance, thereby eliminating slippage.

3. In an electric resistance heating apparatus, a roller electrode, a frame mounting for said electrode, a traction wheel adapted to contact with the work and to advance said frame relative to the work to be heated, and means for coordinating the rotation of the roller electrode with the rate of advance thereof, comprising means for rotating the traction wheel and the roller electrode at the same peripheral velocity.

In witness whereof I have signed my name at Milwaukee, Wisconsin, this 6th day of September, 1930.

ORRIN E. ANDRUS.